(12) United States Patent
Schmetzer (10) Patent No.: US 7,412,815 B2
(45) Date of Patent: *Aug. 19, 2008

(54) WELDING HEAD FOR A STRAP BINDING MACHINE

(76) Inventor: Helmut Schmetzer, Almstr. 5, Bayreuth (DE) D-95448

( * ) Notice: Subject to any disclaimer, the term of this patent is extended or adjusted under 35 U.S.C. 154(b) by 813 days.

This patent is subject to a terminal disclaimer.

(21) Appl. No.: 10/838,402

(22) Filed: May 3, 2004

(65) Prior Publication Data

US 2007/0181261 A1 Aug. 9, 2007

(30) Foreign Application Priority Data

May 22, 2003 (DE) .................... 103 23 153

(51) Int. Cl.
*B65B 13/04* (2006.01)
(52) U.S. Cl. .................... 53/589; 53/399; 53/582; 100/25; 100/29; 100/32; 100/33 PB
(58) Field of Classification Search .................. 53/399, 53/582, 589; 100/25, 26, 29, 32, 33 PB
See application file for complete search history.

(56) References Cited

U.S. PATENT DOCUMENTS

| 3,759,169 A | 9/1973 | Goodley |
| 3,963,535 A | 6/1976 | Lineberg |
| 3,995,409 A | 12/1976 | Discavage et al. |
| 4,575,994 A * | 3/1986 | Takami .................... 53/582 |
| 4,850,179 A * | 7/1989 | Takami .................... 53/589 |
| 5,615,538 A | 4/1997 | Miyashita et al. |
| 6,405,917 B1 | 6/2002 | Mann |
| 6,568,317 B1 * | 5/2003 | Fischer .................... 100/32 |

FOREIGN PATENT DOCUMENTS

| DE | 2 338 020 | 2/1974 |
| DE | 2 338 030 | 2/1974 |
| DE | 26 18 583 | 11/1976 |
| EP | 1 076 006 | 2/2001 |
| GB | 2 150 523 | 7/1985 |
| JP | 62-251314 | 11/1987 |
| JP | 6-329109 | 11/1994 |

OTHER PUBLICATIONS

U.S. Appl. No. 10/844,811, filed May 12, 2004, Schmetzer.

* cited by examiner

*Primary Examiner*—Hemant M Desai
(74) *Attorney, Agent, or Firm*—Jordan and Hamburg LLP (57) ABSTRACT

A welding head for a strap binding machine includes a strap guide element that can be moved into and out of a strap guide path, a welding device that can be moved into and out of the strap guide path and that is for fusing strap segments of overlapping strap ends that are to be welded, and a pressing device for pressing the fused strap segments against a pressure part, the strap guide element and the welding device being pivotably borne and both being directly or indirectly motion-coupled to the longitudinally movable pressing device such that they can be moved into and out of the strap guide path depending on the movement of the pressing device.

16 Claims, 5 Drawing Sheets

WELDING HEAD FOR A STRAP BINDING MACHINE

BACKGROUND OF THE INVENTION

The invention relates to a welding head for a strap binding machine including a strap guide element that can be moved into and out of the strap guide path, a welding device that can be moved into and out of the strap guide path and that is for fusing the strap segments of the overlapping strap ends that are to be welded, and a pressing device for pressing the fused strap segments against a pressure part.

Strap binding machines bind packaged goods, for instance a stack of catalogs or newspapers, with a strap such as a stable plastic strap. In order to fix this strap in its taut state about the package, a welding head is provided that makes it possible to join the two overlapping strap ends of the binding strap, which is first fed via an appropriate insertion apparatus into a frame surrounding the package, the frame then being opened and the strap being securely tautened thereabout (for which a tautening system known from the subsequently published German patent application can be used). This occurs in that the strap ends in the overlapping region are locally fused by means of a welding device and are pressed securely against a pressure part by means of a pressing device such that the joint results in the fused region. The manner in which a binding machine works is sufficiently well known, and it is not necessary to go into greater detail about this.

A welding head of the type cited in the foregoing is known for instance from EP 1 076 006. In the welding head described therein, a strap guide part is provided that can move along a horizontal longitudinal guide and guides the strap that has been inserted in the frame during the insertion process. In order to be able to weld the strap ends to one another, it is necessary to move the strap guide part out of the strap guide path prior to the welding process and to position the welding device there in order to fuse the strap ends so that the fused strap segments can then be compressed subsequently. That is, in addition to the strap guide element in the welding head in accordance with EP 1 076 0006, the welding device is also received longitudinally movable in a longitudinal guide in order that it can be displaced between the non-working position and the working position in the strap guide path between the strap ends. The compression occurs by means of a pressing device, which is also longitudinally displaceable but which, in contrast to the horizontally guided strap guide part and the welding device, is however vertically displaceable, and which, after the welding device has been withdrawn from the strap guide path, presses the fused strap segments together against a pressure part.

Thus, overall a plurality of longitudinal guides are provided for the various parts to be moved during a welding process, which is disadvantageous for a number of reasons. First, longitudinal guides are complex by design. Precisely aligned guides and moving parts must be provided so that precise movement is possible. Furthermore, continuous lubrication is necessary in order to be able to assure low-friction movement. It is also disadvantageous that the longitudinal guides frequently become soiled after they are open in general.

The invention is based on the provision of suggesting a welding head that is improved both in terms of design and in terms of function.

SUMMARY OF THE INVENTION

For solving this problem, it is inventively provided in a welding head of the type described in the foregoing that the strap guide element and the welding device are pivotably borne and both are directly or indirectly motion-coupled to the longitudinally movable pressing device such that they can be moved into and out of the strap guide path depending on the movement of the pressing device.

The complex and disadvantageous longitudinal guides of the strap guide element and the welding device provided in the prior art are eliminated in favor of pivotable bearing for these parts. The pivot bearing is considerably simpler both with respect to design and with respect to cost. In addition, this type of bearing is considerably less sensitive, does not require a continuous supply of lubricant and soiling is largely prevented. Only the pressing device is longitudinally guided, whereby the pressing device is the central element that controls the movement of the strap guide element and the welding device after these have both been directly or indirectly motion-coupled thereto. The motion coupling is thus such that, depending on the movement of the pressing device, the strap guide element and the welding unit are moved in or out of the strap guide path.

Overall this results in a considerably more useful welding head, both in terms of design and in terms of cost, in which only one longitudinal guide is provided. Thus, the problems inherent in the prior art are advantageously no longer at issue.

One useful first inventive alternative provides that the strap guide element is coupled directly to the pressing device and the welding device is coupled directly to the strap guide element such that when the strap guide element moves out of the strap guide path, the welding device moves in the strap guide path. Thus, in this embodiment of the invention the strap guide element is coupled directly to the pressing device and the welding device is coupled indirectly to the pressing device via the strap guide element.

In a reversed motion coupling, one alternative embodiment provides that the welding device is coupled directly to the pressing device and the strap guide element is coupled directly to the welding device (and thus indirectly to the pressing device) such that when the welding device moves into the strap guide path, the strap guide element moves out of the strap guide path. That is, various embodiments are conceivable with respect to the motion coupling. Naturally it is also possible to couple both the strap guide element and the welding device directly to the pressing device.

One useful embodiment of the invention provides for pivoting the strap guide element and the welding device in the same direction about a common point of rotation when they are both moving. That is, both are borne rotatable about a common axis so that there is no need for a separate axis of rotation.

One particularly useful embodiment of the invention provides that the motion coupling of the strap guide element and the welding device is automatically released when the welding device reaches its working position. That is, the motion coupling of both parts is only temporary, whereby the motion coupling is automatically released when it is no longer required. A releasable motion coupling can occur usefully by means of a magnetic coupling, for which purpose a magnet is provided on the strap guide element and/or on the welding device. The magnetic coupling permits simple, reversible coupling of the two parts.

Usefully, the welding device and/or the strap guide element are movable into or out of the working position against a restoring force, which can be simply realized using a spring that produces a restoring force and that either pulls or presses into the working or non-working position, depending on the embodiment.

For simple motion-coupling of one or the other part to the pressing device, it is useful when there is provided at the pressing device or the strap guide element coupled directly thereto or the directly coupled welding device a guide surface that controls the movement of the strap guide element or the welding device, along which surface the strap guide element or the welding device or the pressing device slides. In this context, a roller or drum or the like that slides along the guide surface is usefully provided on the strap guide element or welding device or pressing device.

In addition to pivotably bearing the strap guide element and the welding device, one particularly advantageous embodiment of the invention, also provides for pivotably bearing the pressure part and coupling it as well as the other two parts directly or indirectly to the pressing device such that, depending on the movement of the pressing device, it is movable between one working position, in which the pressing device can press the strap ends thereagainst, and a non-working position, in which the welded binding strap is released. This embodiment of the invention eliminates the disadvantage in the prior art that as a rule the pressure part, which during the welding process is a counterbearing for the pressing device and thereafter must be withdrawn so that the binding strap is released, is likewise longitudinally borne and thus is provided another disadvantageous longitudinal guide mimic. In accordance with the invention, in addition to the other two parts, the pressure part is also pivotably borne and motion-coupled to the pressing device, so that advantageously with the inventive welding head these disadvantages do not exist. Usefully, a guide surface is provided on the pressing device or the pressure part for motion-coupling, along which guide surface the pressure part or the pressing device slides for motion control, whereby a roller or drum or the like that slides along the guide surface can also be usefully provided on one of the parts.

One concrete realization of the motion coupling can provide that the pressing device, after pressing the fused strap ends together, can be moved further in the pressing direction, during which movement the pressure part that until then was counterborne on the guide surface is released and pivots away. For this, provided on the pressing device can be an overhead pressing segment that is joined via at least one spring element to the basic body of the pressing device, which spring element is compressed during the further movement of the pressing device.

As can be seen in the inventive welding head, it is particularly advantageous in comparison to the prior art, which is provided with four longitudinal guides for the pressing device, the strap guide element, the welding device, and the pressure part, that there is only one, that is, that for the pressing device, whereby in terms of movement control the pressing device takes on the central role in the inventive welding head. The other parts of the inventive welding head are realized with particular advantage using simply designed, low-maintenance and low-wear pivot bearings.

In addition to the inventive welding head, the invention furthermore relates to a strap binding machine including a welding head of the type described.

Additional advantages, features, and details of the invention result from the exemplary embodiment described in the following and from the drawings.

BRIEF DESCRIPTION OF THE DRAWINGS

FIGS. 1a-8b illustrate the inventive welding head in various positions assumed during a welding process, whereby each of the figures labeled with "a" shows a front elevation and each of the figures labeled with "b" shows a side elevation of the same position;

Each of the figures illustrates a front elevation and the associated side elevation, whereby for the sake of clarity many parts are only illustrated in one or the other representation.

DESCRIPTION OF THE PREFERRED EMBODIMENTS

Figure 1A:
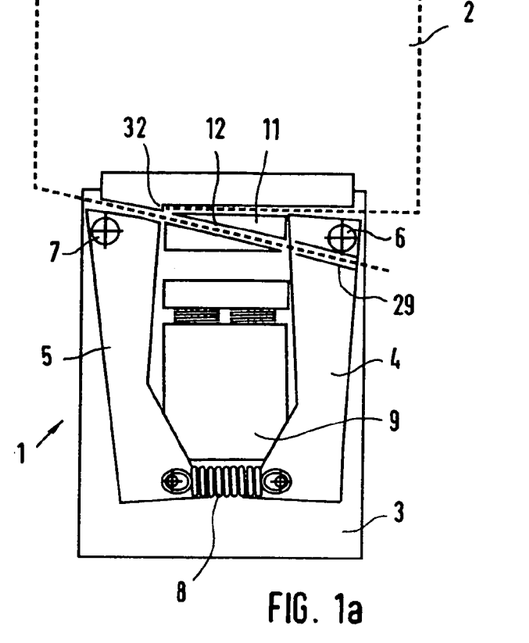
Figure 1B:
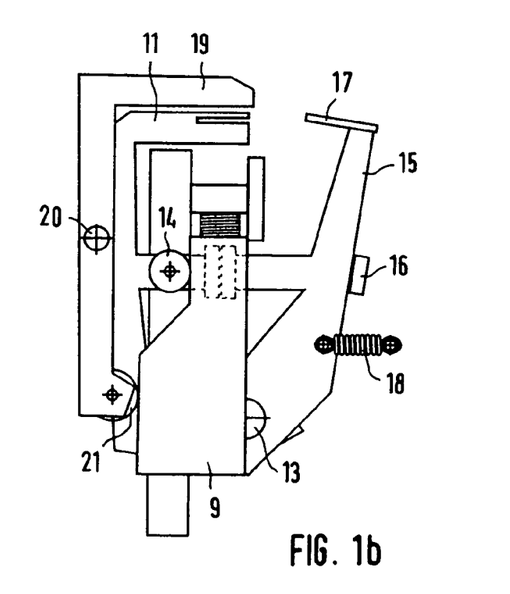

FIGS. 1a and 1b illustrate the inventive welding head 1 in its initial position after the binding strap 2 has been inserted and has been guided in a frame (not shown in greater detail) encircling a package (also not shown in greater detail). The inventive welding head 1 has a base plate 3 on which a right clamping jaw 4 and a left clamping jaw 5 are borne pivotable about pivot bearing 6 and 7, respectively. They are coupled to one another via a spring 8 at their lower ends. Disposed between these two clamping jaws 4, 5 is the pressing device 9, which is longitudinally movable via a longitudinal guide (not shown in greater detail) and with which the two clamping jaws 4, 5 are directly motion-coupled. For this purpose, provided on each side of the pressing device (see for instance FIG. 5a) are two guide surfaces 10 that cooperate with suitable segments provided on each of the clamping jaws 4, 5. In the position illustrated in FIG. 1a, the pressing device 9 is in the lowered position in which it acts on the clamping jaws 4, 5 and forces them outward into the position not acting on the binding strap 2; the spring 8 is under tension.

Furthermore, illustrated is a strap guide element 11 that has an inclined guide channel 12 into which the strap in FIG. 1a is inserted, coming from the right. The strap guide element 11 is pivot-borne about the pivot axis 13 (see also for instance FIG. 5b). It can pivot between the working position illustrated in FIGS. 1a and 1b and the outwardly pivoted position illustrated for instance in FIGS. 5a and 5b, that is, the position not disposed in the strap guide path. For this purpose, the strap guide path 11 is likewise directly motion-coupled to the pressing device 9, for which reason provided on the strap guide element 11 is a roller 14 that acts on the back side of the pressing device 9. The base plate 3 is perforated so that the individual parts can cooperate with one another. At this point it should be noted that the figures illustrate the basic design principle and of course appropriate additional housing or holding parts are provided that form the axes of rotation, etc.

Furthermore provided is a welding device 15 (see for instance FIGS. 1b and 5b) that is movable between a non-working position (FIG. 1b), in which it is counterborne on an appropriate counterbearing 16, and a working position (FIG. 5b), in which its welding tongue 17, which fuses the strap ends, is disposed in the strap guide path. The welding device 15, together with the strap guide element 11, is pivotably borne about the common pivot bearing 13, and can be moved into the working position against the restoring force of a spring 18.

Figure 5A:
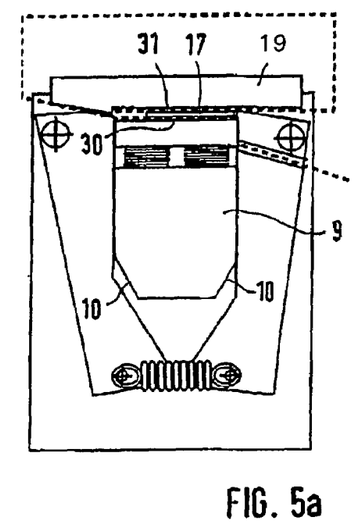
Figure 5B:
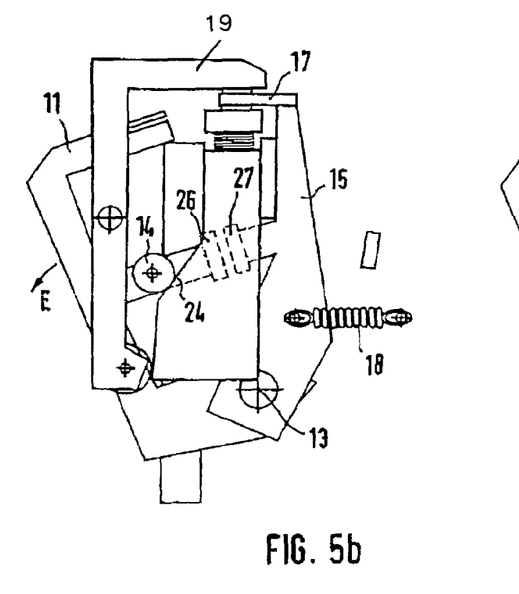

Finally, a pressure plate 19 is provided against which the pressing device 9 presses the strap ends (see for instance FIG. 5b). The pressure plate 19 is also borne pivotable about a pivot bearing 20. It is likewise directly motion-coupled to the back side of the pressing device 9 via a roller 21 and counterborne there.

Overall, then, it is only the pressing device 9 that is longitudinally borne, while the two clamping jaws 4, 5, the strap guide element 11, the welding device 15, and the pressure plate 19 are all movably received in simple pivot bearings.

Starting with FIGS. 1*a*, 1*b*, the working process of the welding head 1 will now be described in the following.

As has already been stated, FIGS. 1*a* and 1*b* illustrate the situation immediately after the binding strap 2 has been inserted. Starting from this position, the pressing device 9 is moved somewhat upward into the position illustrated in FIGS. 2*a*, 2*b*. What this leads to is that initially the right clamping jaw 4 is released after the guide surface 10 allocated to it, embodied as an inclined surface, is drawn upward during the movement, and the clamping jaw 4 can slide therealong. Due to the restoring force of the spring 8, it is moved in the direction of the arrow A about the pivot bearing 6, until the clamping segment 22, here the upper left and inwardly directed edge, acts on the binding strap 2. As can be seen, the clamping segment 22 is to the left and inward of the pivot bearing 6. What this leads to is that the clamping jaw 4, during the retraction movement of the binding strap 2 (opposing the insertion direction) into the strap storage unit (which, along with the other parts of a known binding apparatus, is not shown here) to tauten the strap about the packaged good to be bound. In order to fix the binding strap 2, at this point the clamping jaw 4 is already engaged. Due to the position of the clamping segment 22, it clamps even stronger with the strap, which, after the frame (not shown here) is opened, is retracted against the insertion direction. The binding strap is thus fixed on one side. Starting from the position in FIGS. 2*a*, 2*b*, the pressing device 9 is now pushed further upward until the guide surface 10 of the pressing device 9, that is allocated to the left clamping jaw 5, releases it such that it pivots due to the restoring force of the spring 8 and clamps the binding strap 2 (arrow B). The clamping segment 23 is also disposed to the center right at the upper portion of the clamping jaw 5.

Figure 2A:
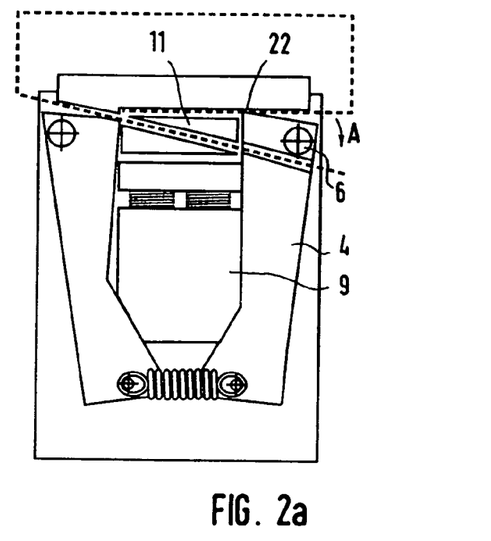
Figure 2B:
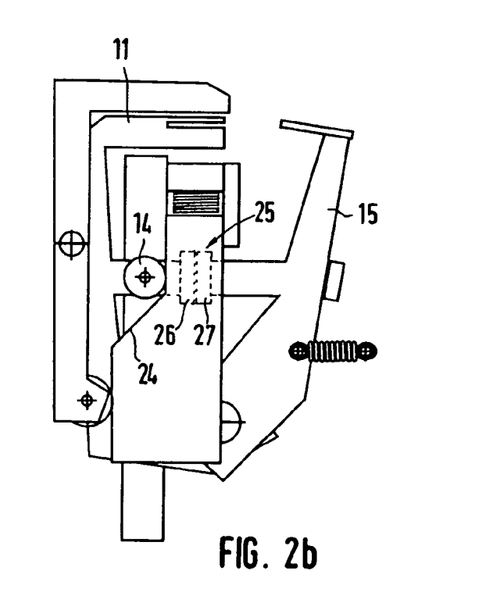
Figure 3A:
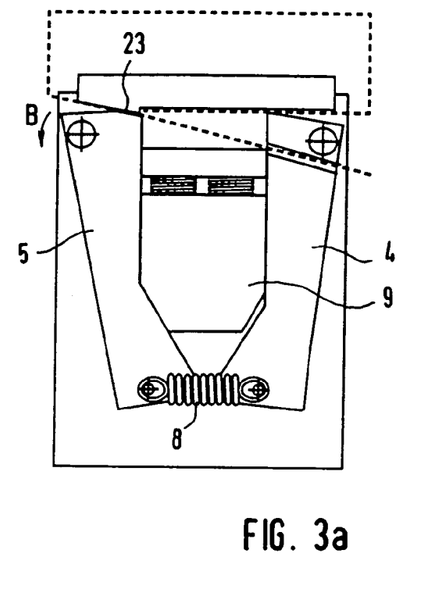
Figure 3B:
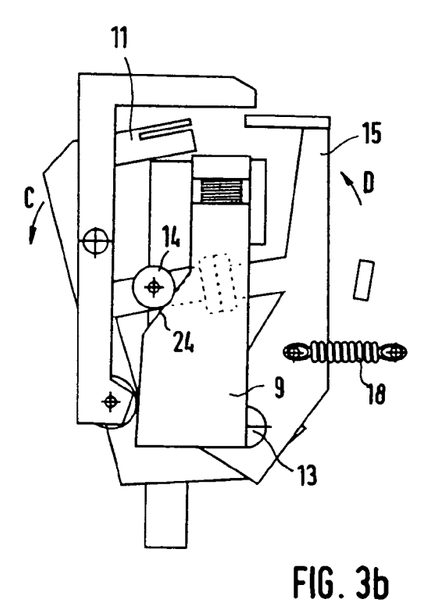

During this movement, the strap guide element 11 simultaneously pivots out of the strap guide path in which it is still situated in the position in accordance with FIGS. 2*a*, 2*b* (see FIG. 3*b*). What this realizes is that during the movement of the pressing device 9 into the position in accordance with FIGS. 3*a*, 3*b*, the roller 14 runs on the inclined guide surface 24 on the back side of the pressing device 9 and in doing so causes the strap guide element to pivot to the left about the pivot bearing 13 out of the strap guide path (arrow C).

Simultaneous to this outward pivoting movement by the strap guide element 11, the welding device 15 moves in the direction of the strap guide path (see FIG. 3*b*). For this purpose, the strap guide element 11 and the welding device 15 are directly motion-coupled to one another, for which purpose a magnetic coupling 25 is provided that in the illustrated example includes two magnets 26, 27, of which one is arranged on the strap guide element 11 and one is arranged on the welding device 15. Thus, if the welding device 15 moves, the welding device 15 automatically moves about the common pivot bearing 13 (arrow D) while the coupling exists. The spring 18 is placed under tension. In every case, the binding strap stretched about the package is fixed at two points via the clamping jaws 4, 5 after reaching the position in accordance with FIGS. 3*a*, 3*b*.

Figure 4A:
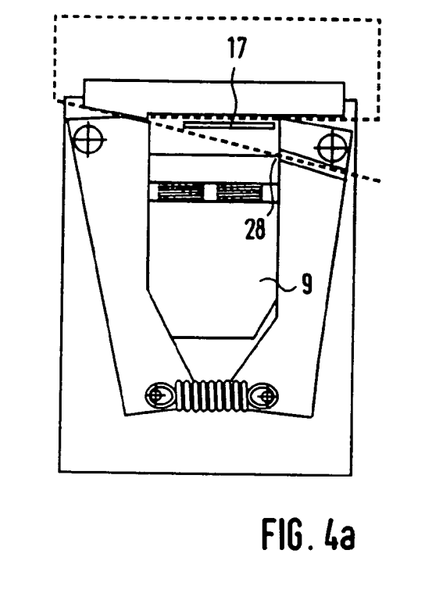
Figure 4B:
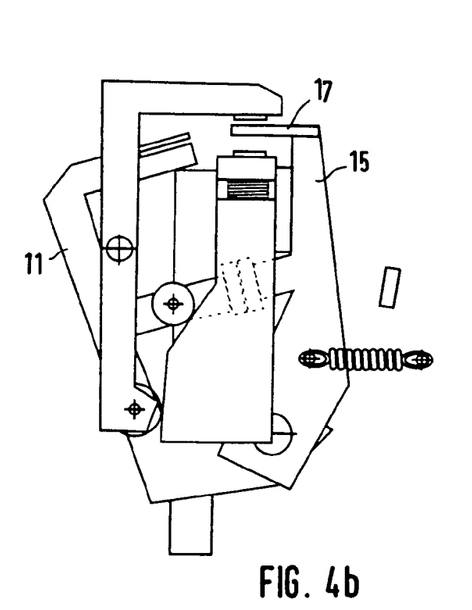

Now, starting with the position in accordance with FIGS. 3*a*, 3*b*, if the pressing device 9 moves further upward, the roller 14 continues to run on the guide surface 24, so that the strap guide element 11 is moved even further to the left out of the strap guide path and the welding device 15 is moved even further to the left into the strap guide path. FIGS. 4*a*, 4*b* illustrate the welding device 15 with the welding tongue 17 disposed in the strap guide path.

Now, starting with the position in accordance with FIGS. 4*a*, 4*b*, if the pressing device 9 moves even further upward, a knife edge 28 cuts the binding strap 2 in the region of the right clamping jaw 4, which has a corresponding through-hole 29 for the strap to be inserted, as the figures illustrate. When the pressing device 9 is lifted even further, the rear strap end 30 overlaps the front strap end 31, which is still in the original position directly below the pressure part 19, which has a corresponding catch edge 32. Disposed between these two ends is the hot welding tongue 17. The two strap ends are fused in this position.

Furthermore, during the movement into the position in accordance with FIGS. 5*a*, 5*b*, the magnetic coupling 25 and thus the motion-coupling of the welding device 15 to the strap guide element 11 is released. This occurs because the roller 14 runs even further on the guide surface 24, that is, pivots to the left (arrow E), while the welding device 15 is already fixed in its working position. Because the strap guide element 11 is forced to move to the left via the guide surface 24, the two magnets 26, 27 are forced apart and thus the welding device 15 is released.

Figure 6A:
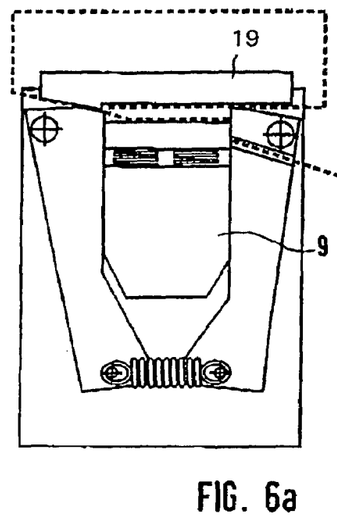
Figure 6B:
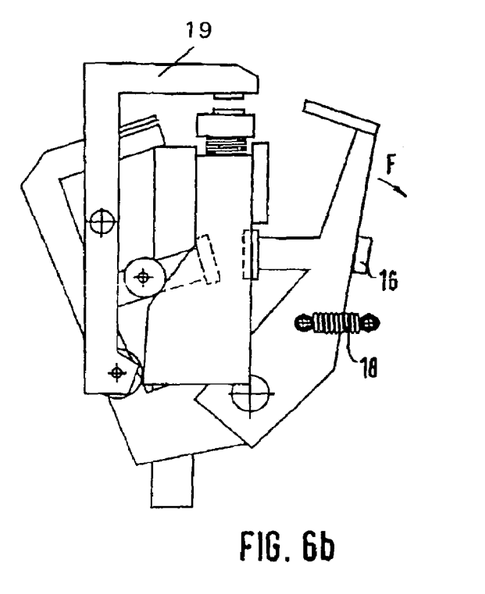

Subsequently (FIGS. 6*a*, 6*b*), the pressing device 9 is retracted a short distance so that the weld joint unloads somewhat with respect to the pressure plate 13 and thus the clamped welding tongue 17 is also released. What this leads to is that the welding device 15 is completely released and is pulled back into the non-working position by the spring 18, as illustrated in FIG. 6*b* (arrow F).

In the next step (FIGS. 7*a*, 7*b*), the pressing device 9 again travels upward so that the strap ends 30, 31 are pressed against the pressure plate 13 and join securely to one another as a result of the fusing. The two strap ends 30, 31 are pressed together for a certain period of time until the weld joint has cooled sufficiently.

Figure 7A:
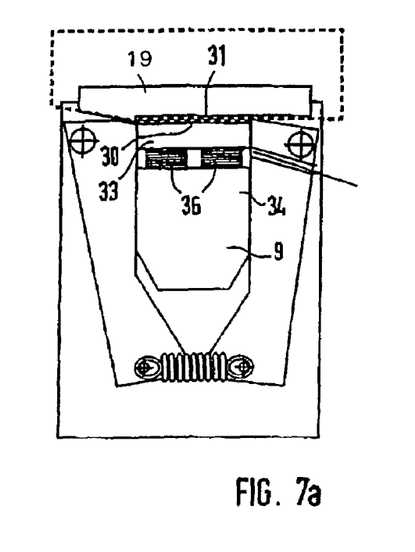
Figure 7B:
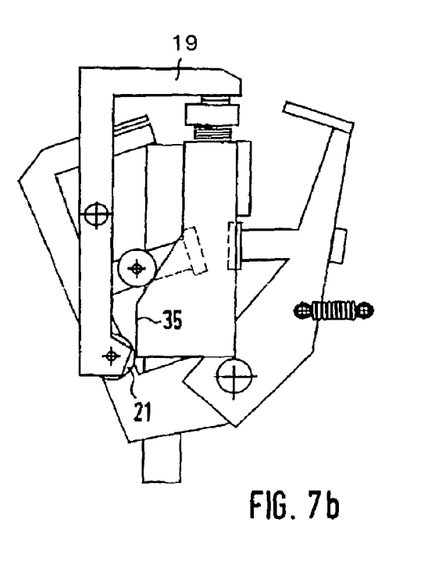
Figure 8A:
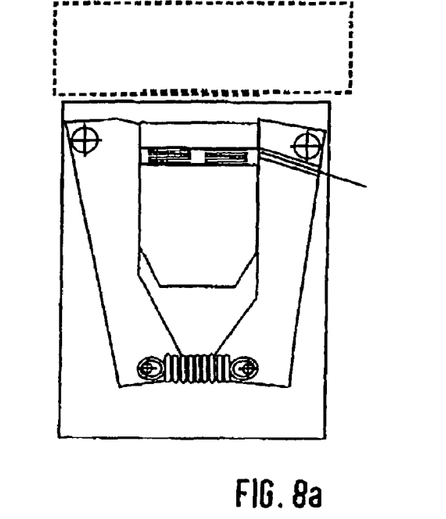
Figure 8B:
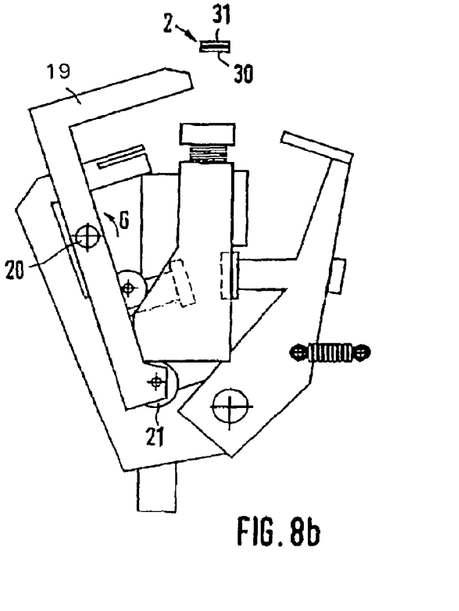

In the position illustrated in FIGS. 7*a*, 7*b*, the pressure plate 13 is disposed between the welded binding strap and the package, that is, the package is adjacent to the pressure plate 13. It is now necessary to release the welded binding strap so that the bound package can be removed. This occurs in that the pressing device 9 is moved somewhat further upward, whereby two springs 36, via which the pressing segment 33 of the pressing device, which pressing segment acts on the lower strap end 30 and is joined to the base body 34 of the pressing device 9, are compressed. The base body 34 moves somewhat upward, which leads to the situation in which when there has been a transition into the position illustrated in FIGS. 8*a*, 8*b*, the roller 21, via which the pressure plate 13 had thus far been counterborne on the guide surface 35 of the pressing device 9, is released. Because of the pressure that the pressing device 9 exerts against the pressure plate 13, upon reaching the release position, it automatically pivots about the pivot bearing 20 (arrow G) out of the strap guide path into the release position illustrated in FIG. 8*b*, in which the welded binding strap 2 is released.

Then the pressing device 9 moves back downward, which leads to a situation in which initially the pressure plate 13 pivots back into the starting position, so the roller 21 runs back up the guide surface 35. As the pressing device lowers, the roller 14 of the strap guide element 11 also runs back up the guide surface 24, which leads to a situation in which the strap guide element 11 is moved back into the position in the strap guide path illustrated in FIG. 1*b*. This can be realized using a spring (not shown in greater detail) that pulls the strap guide element 11 back into the position, which spring is placed under tension while the strap guide element pivots out of the strap guide path. Once in the position in the strap guide path, the two magnets 26, 27 act upon one another again so that the releasable motion-coupling between strap guide element 11 and welding head 1 is re-created. While the pressing device 9 moves downward, furthermore, the two clamping jaws 4, 5, now adjacent to the guide surfaces 10, are pressed apart from one another, and they pivot about the pivot bearing 6, 7 into the position in accordance with FIG. 1a. Now another welding process can begin, starting with inserting the binding strap.

It is noted that FIGS. 1a-8b merely illustrate the principles for the functioning of the inventive welding head. For reasons of clarity, housing parts and the like on which each of the elements is guided or borne are not illustrated. This also applies with respect to the motion control of the pressing device 9, which must be raised and lowered cyclically as described. This can occur for instance via a suitable curve control, or even via a suitable lifting means, e.g., a cylinder, or even via an electromotor.

Figure 9:
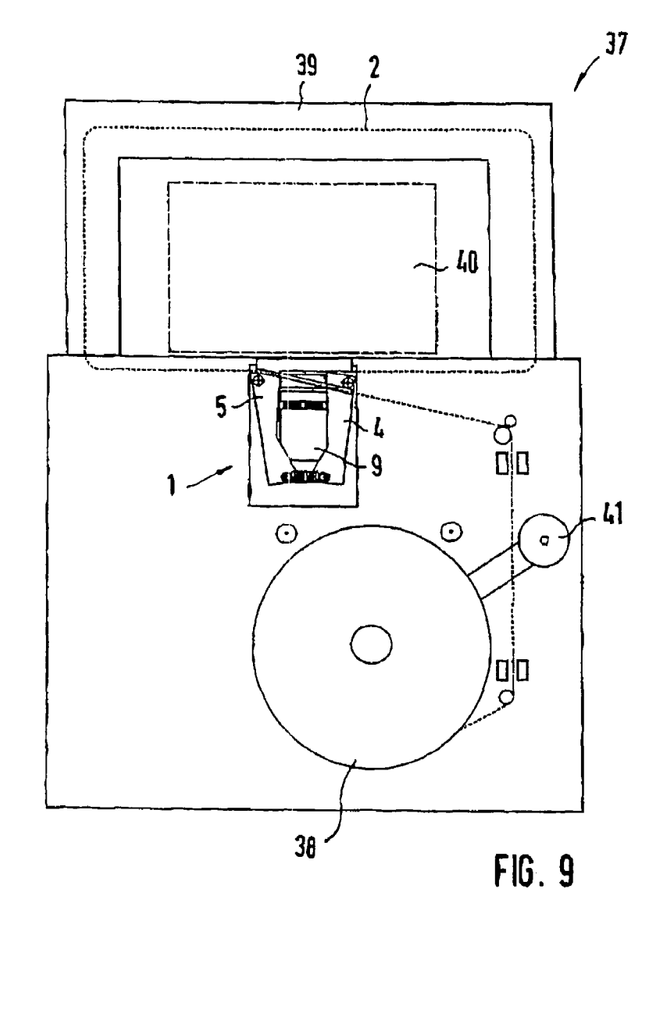
FIG. 9 illustrates the principle of a binding machine with the welding head, shown in a front elevation.
Figure 10:
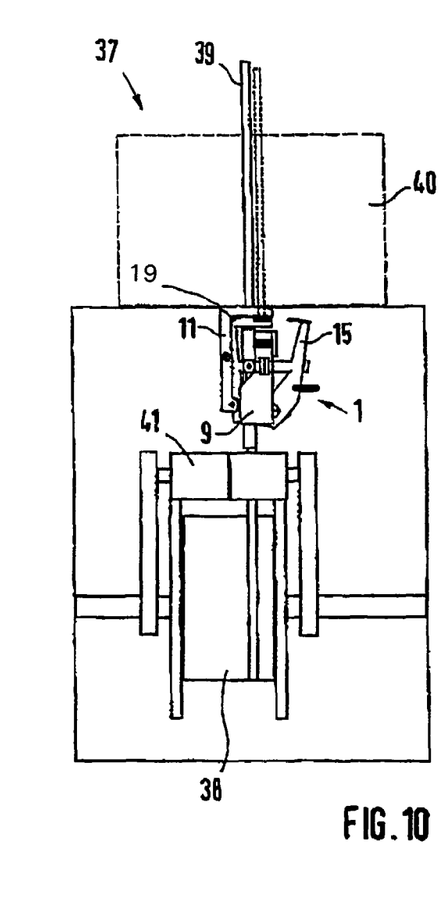
FIG. 10 illustrates a side elevation of the binding machine in FIG. 9.

FIGS. 9 and 10 illustrate a binding machine with the described welding head. The binding machine 37 has a strap reel 38 from which a strap 2 to be inserted is drawn off. This is inserted into a frame 39 that encircles the package 40 by the welding head 1. After the strap is fixed using the clamping jaws 4, the frame 39 is opened so that the strap 2 can be tautened by means of the lever tautener 41, which pivots to the left and carries the strap. The tautening mechanism is known from German patent application 120 32 580.4. Then the described welding process begins.

The invention claimed is:

1. A welding head for a strap binding machine, comprising:
   a support;
   a strap guide element movable into and out of a strap guide path;
   a welding device movable into and out of the strap guide path operable for fusing strap segments of overlapping strap ends that are to be welded; and
   a pressing device movable longitudinally for pressing the fused strap segments against a pressure part, said strap guide element and said welding device being pivotably borne on said support, one of said strap guide element or said welding device including a contact region integral therewith or carrying a contact part thereon which includes said contact region, said contact region being engagebly contactable with said pressing device such that longitudinal movement of said pressing device is converted directly into pivoting movement of said one of said strap guide element and said welding device, a remaining one of said one of said strap guide element and said welding device being coupled to said one of said strap guide element and said welding device so as to impart pivoting motion thereto in response to said longitudinal movement of said pressing device.

2. The welding head according to claim 1, wherein said one of said strap guide element and said welding device is said strap guide element which is coupled directly to said pressing device via said contact region and said welding device is coupled directly to said strap guide element such that when said strap guide element moves out of the strap guide path, said welding device moves into the strap guide path.

3. The welding head according to claim 2, wherein motion coupling of said strap guide element and said welding device is automatically released when said welding device reaches a working position thereof.

4. The welding head according to claim 1, wherein said one of said strap guide element and said welding device is said welding device which is coupled directly to said pressing device via said contact region and said strap guide element is coupled directly to said welding device such that when said welding device moves into the strap guide path, said strap guide element moves out of the strap guide path.

5. The welding head according to claim 1, wherein said strap guide element and said welding device pivot in a same direction about a common point of rotation when said strap guide element and said welding device are both moving.

6. The welding head according to claim 1, further comprising a magnetic coupling for coupling said strap guide element to said welding device.

7. The welding head according to claim 1, wherein at least one of said welding device or said strap guide element are movable into or out of the working position against a restoring force.

8. The welding head according to claim 7, wherein:
   said restoring force is produced by a spring; and
   said spring either pulls or presses said welding device or said strap guide element into the working or non-working position.

9. The welding head according to claim 1, wherein provided at said pressing device or said strap guide element coupled directly thereto or said directly coupled welding device is a guide surface that controls the movement of said strap guide element or said welding device, along which surface said strap guide element or said welding device or said pressing device slides.

10. The welding head according to claim 9, wherein said other contact part includes a roller or drum which is slidable along said guide surface.

11. The welding head according to claim 1, wherein said pressure part is borne pivotable and is motion-coupled to said pressing device such that, depending on the movement of said pressing device, it is movable between one working position, in which said pressing device can press said strap ends thereagainst, and a non-working position, in which the welded binding strap is released.

12. The welding head according to claim 11, wherein a guide surface is provided on said pressing device or said pressure part, along which guide surface said pressure part or said pressing device slides for motion control.

13. The welding head according to claim 12, wherein a roller or a drum that slides along said guide surface is provided on said pressure part or said pressing device.

14. The welding head according to claim 11, wherein said pressing device is subjectable to further movement in the pressing direction after pressing said fused strap ends together, during said further movement said pressure part, that was until then counter borne on said guide surface, is released and pivots away.

15. The welding head according to claim 14, wherein provided on said pressing device is an overhead pressing segment that is joined via at least one spring element to the basic body of said pressing device, which spring element is compressed during the further movement of said pressing device.

16. A strap binding machine comprising a welding head, said welding head comprising:
   a support;
   a strap guide element movable into and out of a strap guide path;
   a welding device movable into and out of the strap guide path operable for fusing strap segments of overlapping strap ends that are to be welded; and a pressing device movable longitudinally for pressing the fused strap segments against a pressure part, said strap guide element and said welding device being pivotably borne on said support, one of said strap guide element or said welding device including a contact region integral with said one of said strap guide element and said welding device or carrying a contact part thereon which includes said contact region, said contact region being engagebly contactable with said pressing device such that longitudinal movement of said pressing device is converted directly into pivoting movement of said one of said strap guide element and said welding device, a remaining one of said one of said strap guide element and said welding device being coupled to said one of said strap guide element and said welding device so as to impart pivoting motion thereto in response to said longitudinal movement of said pressing device.

\* \* \* \* \*